US008869557B2

(12) United States Patent
Felgenhauer et al.

(10) Patent No.: US 8,869,557 B2
(45) Date of Patent: Oct. 28, 2014

(54) METHOD AND DEVICE FOR SUPPLYING LUBRICANT TO AN I.S. GLASSWARE FORMING MACHINE

(75) Inventors: Benedikt Felgenhauer, Herford (DE); Dennis Isensee, Lindhorst (DE); Thomas Engler, Nienstadt (DE)

(73) Assignee: Heye International GmbH (DE)

( * ) Notice: Subject to any disclaimer, the term of this patent is extended or adjusted under 35 U.S.C. 154(b) by 446 days.

(21) Appl. No.: 12/552,410

(22) Filed: Sep. 2, 2009

(65) Prior Publication Data

US 2010/0058808 A1 Mar. 11, 2010

(30) Foreign Application Priority Data

Sep. 10, 2008 (DE) .................. 10 2008 046 655

(51) Int. Cl.
*C03B 40/027* (2006.01)
*F16N 17/02* (2006.01)
(Continued)

(52) U.S. Cl.
CPC ............. *F16N 7/385* (2013.01); *F16N 2250/08* (2013.01); *F16N 2270/30* (2013.01); *F16N*
(Continued)

(58) Field of Classification Search
CPC ....... C03B 40/00; C03B 40/027; F16N 17/02; F16N 29/00; F16N 2230/10; F16N 2270/30; F16N 2270/32
USPC .................. 65/26, 29.1–29.19, 160, 162, 261
See application file for complete search history.

(56) References Cited

U.S. PATENT DOCUMENTS 4,391,620 A * 7/1983 Geisel ............................... 65/26
4,409,010 A * 10/1983 Brown ............................. 65/26
(Continued)

FOREIGN PATENT DOCUMENTS

DE 3532203 3/1986
DE 20022934 7/2002
(Continued)

OTHER PUBLICATIONS

EPO Notification dated Dec. 19, 2009 in related EPO Application 09010963.8 with Search Report and Written Opinion. An English Translation of the Written Opinion is provided.
(Continued)

*Primary Examiner* — Matthew Daniels
*Assistant Examiner* — Cynthia Szewczyk
(74) *Attorney, Agent, or Firm* — Fox Rothschild LLP

(57) ABSTRACT

The invention relates to a method for supplying lubricating points of an I.S. glassware forming machine, wherein a used lubrication system comprises a plurality of lubricant metering devices (29) that are provided to output lubricant to a plurality of lubricating points, that are to be lubricated, of the glassware forming machine and are allocated in each case to one of several lubrication circuits (23-28). The lubricant metering devices of a respective lubrication circuit simultaneously output a predetermined amount of lubricant in each case cyclically with a time interval allocated to the lubrication circuit. The lubricant metering devices are allocated to lubrication circuits in dependence upon temperatures that have been measured in direct proximity to lubricating points, and are allocated such that the temperatures of the lubricating points of a lubrication circuit are within a predetermined temperature range. The amounts of lubricant provided at the lubricating points are controlled in that the length of the time interval allocated to a lubrication circuit is determined in dependence upon temperatures, that have been measured in direct proximity to lubricating points of the lubrication circuit, using a set of evaporation characteristics of the lubricant. In accordance with the invention, the consumption of lubricant can be further reduced. The invention further relates to a device for implementing the method.

15 Claims, 4 Drawing Sheets

(51) Int. Cl.
*F16N 29/00* (2006.01)
*F16N 29/02* (2006.01)
*F16N 7/38* (2006.01)
*C03B 9/40* (2006.01)

(52) U.S. Cl.
CPC ...... 29/02 (2013.01); *C03B 40/027* (2013.01); *F16N 2230/02* (2013.01); *C03B 9/403* (2013.01); *F16N 2230/06* (2013.01)
USPC .............................................. 65/26; 65/29.1

(56) References Cited

U.S. PATENT DOCUMENTS

| | | | |
|---|---|---|---|
| 4,648,893 A | 3/1987 | Roux | |
| 4,657,115 A | 4/1987 | Gresens | |
| 4,765,821 A * | 8/1988 | Doud | 65/169 |
| 5,711,615 A | 1/1998 | Stitz et al. | |
| 5,971,107 A | 10/1999 | Stitz et al. | |
| 6,179,597 B1 | 1/2001 | Ito et al. | |

FOREIGN PATENT DOCUMENTS

| | | |
|---|---|---|
| DE | 69433065 | 6/2004 |
| DE | 69433065 T2 | 6/2004 |
| EP | 0854314 | 7/1998 |
| EP | 0931974 A1 | 7/1999 |
| EP | 1043483 | 10/2000 |

OTHER PUBLICATIONS

Art Lawrence, Throwing It All Away, Glass, 79 (2002) 5, p. 162 (Jun. 2002).

Art Lawrence, Managing Modern Lubricants, Glass, 80 (2003) 2, pp. 52-53 (Mar. 2003).

Multi-Cycle Lubrication Control Centre, [retrieved online Jan. 7, 2008] Retrieved from the Internet, <URL: http://www.graphoidal.com/products/lubetwo.html.

* cited by examiner

METHOD AND DEVICE FOR SUPPLYING LUBRICANT TO AN I.S. GLASSWARE FORMING MACHINE

BACKGROUND

The invention relates to a method and a device for supplying lubricant to a plurality of lubricating points of an I.S. glassware forming machine.

Central lubrication systems for I.S. glassware forming machines are conventionally known and operate on the basis of loss lubrication and comprise only one lubrication circuit. The length of the time interval between two lubrication processes depends upon the lubricating point that must be re-lubricated first. Lubricant metering devices of the same size are generally used in these systems so that the amount of lubricant output per lubrication process of a lubricating cycle is the same for all lubricating points, independent of the geometric size of the lubricating point. As a result, the majority of lubricating points are supplied with too much lubricant and too frequently.

In order to reduce this type of over-lubrication, systems with a series of several lubrication circuits have been used for a while. Each lubrication circuit comprises a group of lubricating points that are combined according to the criterion of a reasonable length for the lubricating interval. In this manner, each group of lubricating points is supplied with lubricant by the dedicated lubrication circuit in a lubricating cycle independent of the other lubrication circuits.

Although controlling the lubricating interval according to need in this manner represents a considerable improvement compared with the central lubrication systems first mentioned, provision is generally made in these known multi-circuit lubrication systems for the times to be adjusted once and to remain unaltered for the remainder of the service life of the I.S. glassware forming machine. However, this does not take into account the fact that the majority of glassware forming machines are subject to frequent job changes, wherein the size of the hollow glass article, the machine speed and other parameters are modified. In the meantime, in practice multi-circuit lubrication systems of this type having a control unit have become known (companies Graphoidal Ltd., Dronfield, United Kingdom and Graphoidal Developments Ltd., Chesterfield, United Kingdom), wherein the time interval lengths of a lubrication circuit can be changed independently of each other by means of operator programming. This allows lubricant to be saved which represents a considerable improvement in particular in the use of synthetic oil not only with respect to the impact on the environment but also financially ("Throwing it all away", A. Lawrence, Glass 79 (2002)5, page 162; "Managing modern lubricants", A. Lawrence, Glass 80 (2003)2, pages 52-53). Each lubrication circuit can be supplied independently via only a single pump via a respective valve having different preset time interval lengths or idle times.

Although such a lubrication system basically allows different lubricating points to be lubricated at different intervals, it is left to the operator to decide how to divide the circuit and how often it is lubricated. The amount of lubricant provided at the lubricating points is not controlled. In this regard, Graphoidal Developments Ltd. describes the option of providing different time interval lengths for different mechanisms, such as the mechanics of a respective section of the I.S. glassware forming machine, the plunger mechanism, the feeder mechanics, the shearing mechanism, the machine belt and handling elements in the forming region. Thus, grouping the lubricating points in the lubrication circuit is suggested, wherein the spatial arrangement forms the criterion for the allocation. However, this criterion is not really suitable in terms of reducing the consumption of lubricant since the temperature of the respective lubricating point is of utmost importance for evaporation losses of the lubricant. However, the temperatures of the lubricating points could differ greatly from each other even in the case of a relatively similar spatial arrangement. For example, the temperature values in the region of the section mechanics are spread over a range of up to 200° C.

In addition to such a method of the generic type or such a device of the generic type, there is the following Prior Art:

EP 1 043 483 A1 discloses the provision of characteristic field-related control of lubricant pumps for internal combustion engines, wherein provision can also be made to measure the temperature at a point to be lubricated. However, the characteristic field relates to desired pressure values of the lubricant.

DE 200 22 934 U1 discloses the consideration of the evaporation of lubricant per se (cf. page 5, last paragraph).

DE 694 33 065 T2 relates specifically to supplying a roller bearing with lubricant, wherein the use of characteristic fields to control the metering of the lubricant is also basically mentioned.

Reference is also made to DE 35 32 203 A1 that relates to a particular manner of lubricating an opening casting mold of an I.S. glassware forming machine.

SUMMARY OF THE INVENTION

The object of the invention is to provide a method of the generic type by means of which the consumption of lubricant can be further reduced in a simple manner. Furthermore, the object of the invention is to provide a device of the generic type suitable for implementing this method.

In one form, the method of the present invention provides a lubrication system that is provided for an I.S. glassware forming machine which includes a plurality of lubricant metering devices. These lubricant metering devices are used to output lubricant, e.g., oil, to a plurality of lubricating points of the glassware forming machine. The lubricant metering devices each appertain to one of several lubrication circuits of the lubrication system and can be allocated to one or several lubricating points. Provision is thereby made for all the lubricant metering devices of a respective lubrication circuit to simultaneously output a predetermined amount of lubricant cyclically or regularly with a predetermined time interval between each outputting of the lubricant for the respective lubrication circuit. The amount of lubricant output can indeed be different for the lubricant metering devices of a lubrication circuit. The time interval can also be referred to as lubricating cycle time.

The lubricant metering devices have been allocated in each case to a lubrication circuit—in dependence upon temperatures that have been measured in the case of a series of, or all, lubricating points in direct proximity thereto—such that the temperatures of the lubricating points of a lubrication circuit are within a predetermined temperature range. Although the wording "in direction proximity" is also to include the option of measuring the temperature directly on the lubricating point, provision is generally made to measure the temperature at a location adjacent to the lubricating point for practical reasons. In this manner it is ensured that all lubricating points of a lubrication circuit have a similar temperature within a predetermined temperature range. The lubricating points for which the temperature is measured as described can be selected such that they are representative of corresponding lubricating points, for example for lubricating points that are identical in terms of function but that appertain to a section of the I.S. glassware forming machine that is known from basic experience to be slightly cooler than the section in which the temperature of the lubricating point was measured.

Provision is further made in accordance with the invention to control the amount of lubricant provided to the lubricating points. For this purpose, the length of the time interval between the outputting of two amounts of lubricant is controlled in dependence upon temperature values that have been measured in direct proximity to lubricating points of a lubrication circuit. A set of evaporation characteristics of the lubricant is thus used. This set of evaporation characteristics indicates the evaporation loss over time in dependence upon temperature. Such a set of evaporation characteristics is heavily dependent upon the type of lubricant. For example, in the case of oils that are based on mineral oils, the evaporation loss can be ten times higher than in the case of special fully-synthetic oils for I.S. glassware forming machines. It is therefore useful, when starting up an I.S. glassware forming machine, to pre-set the time interval lengths of the lubrication circuit in dependence upon the type of lubricant. If several different types of lubricant are used within a glassware forming machine, several associated sets of evaporation characteristics can of course also be used accordingly.

For the control, the temperature value measured in direct proximity to the respective lubricating point can be used or a slightly adapted temperature value for which the small distance of the measuring location from the lubricating point is taken into consideration.

The invention is based on the knowledge that the temperature of a lubricating point or of the lubricant located there is of utmost importance as to what extent the lubricant is subject to evaporation. There is a non-linear correlation between the temperature and the evaporation rate. For example, depending upon the temperature range, reducing the temperature by 10° C. can cause the time interval lengths to be doubled.

Depending upon the position in the I.S. glassware forming machine, the lubricating points are possibly subject, however, to extremely different thermal loads and the necessity of re-lubrication is correspondingly different.

As all lubricating points that are subject to a similar thermal load are grouped in one lubrication circuit in accordance with the invention, there is the option of subjecting them to a lubrication process at the same time. In this manner, it is possible to avoid over-supplying lubricant to lubricating points that are thermally loaded to a considerably lesser extent than other lubricating points of the lubrication circuit. The consumption of lubricant can thus be reduced.

Measuring the temperatures to be determined at the lubricating points is a simple, feasible manner of establishing the temperature values. It has been shown that an algorithm for establishing the temperature values in dependence upon the process parameters of machine speed, article weight, production process, type of cooling, etc., is fraught with difficulties in practice since in addition a series of external conditions (such as the time of year, machine location, draught, etc.) also have an influence on the temperature of a lubricating point.

A substantial advantage of the invention is that the time intervals can be selected in particular such that the respective lubricating points can indeed by supplied relatively frequently with an amount of lubricant predetermined by the selected lubricant metering device, but the lubricating points are not over-lubricated. A more frequent application of lubricant is considered to be of greater value qualitatively over time than a less frequent application of a greater amount of lubricant with the same overall amount per day. This is due to the fact that the quality of the lubricant decreases over the length of time the lubricant is located at the lubricating point. For the most part, a suitable lubricating film thickness is in the micrometer range. The invention includes the supply of lubricant as needed by means of adapting the lubricating interval.

The lubricant metering devices can be in particular injectors.

The highest measured temperature value of all the lubricating points of a lubrication circuit can be taken as the decisive factor for determining the time interval lengths of a lubrication circuit. In this manner it is ensured that no lubrication point receives a supply of lubricant which is too small in terms of its temperature. In particular in the case of a relatively small predetermined temperature range, provision could also be made to use an average value of the measured temperature values or of a selection of the measured temperature values as the decisive factor.

When determining the time interval lengths of a lubrication circuit, one or more further parameters in addition to the temperature of the lubricating points can also be considered. For example, the time interval lengths can be determined in particular in dependence upon kinematic conditions. Included in this regard are the machine speed, i.e., the number of plunger strokes per unit of time, and also the speed or speed profile of machine parts moving on the lubricating point. Tribological conditions such as type of friction or friction pairing of such machine parts, and also their geometric conditions such as size ratios, can also be considered. Further, the cooling conditions can also be considered when determining the time interval lengths since in the case of radial cooling, the lubricating points at the level of the upper plate of the I.S. box (top plate) are loaded to a relatively large extent; in contrast in the case of axial cooling it is the lubricating points over the molds which are loaded to a relatively large extent.

Furthermore, the time interval lengths of a lubrication circuit can preferably be determined in addition in dependence upon process variables. Such process variables can be for example the article weight, the number of plunger strokes per unit of time as already mentioned above, and the feeder temperature. Depending upon the article weight and the machine speed, more or less thermal energy is released per unit of time during the molding process at each section of the I.S. glassware forming machine, in that the glass gobs cool or a certain amount of heat is lost therefrom. The heating of the lubricating points is correspondingly different and the evaporation losses of the lubricant vary. The temperature of a lubricating point is, in the case of an I.S. glassware forming machine, mainly due to the heat released in the glass article-production process.

The set of evaporation characteristics used can also consider as a further technical parameter the speed of a moving machine part, to be lubricated, of the lubricating points. The higher the speed, the earlier fresh lubricant has to be supplied. A temperature-dependent loss of lubricant can be indicated by the speed which means that reference can also be made to a set of loss characteristics.

Since in accordance with the invention the lubricating points within a lubrication circuit have similar temperatures, these lubricating points can be considerably different in terms of their function so that preferably the strokes or output amounts from the lubricant metering devices of a lubrication circuit are different.

Provision can further be made, when starting up an I.S. glassware forming machine, for a start-up procedure that is automatically controlled by a controlling unit to take place, wherein the time interval lengths are successively increased, since when starting up an I.S. glassware forming machine, all the friction partners are not yet completely covered with lubricant and residues from the assembly process are still partly located in the lubricating points. Furthermore, the reaction layers consisting of lubricant, wear debris, etc., necessary for efficient lubrication are not yet formed in the lubrication gaps. For this reason, a certain start-up time is required over several weeks until the lubrication system operates in a trouble-free manner. The automatic start-up procedure permits an accurate and fixed adjustment of the time interval lengths of the lubrication circuit.

Provision can also be made, after a standstill period of an I.S. glassware forming machine and when restarting the glassware forming machine, for a restart procedure that is automatically controlled by a controlling unit to take place. During a standstill period of the machine, the supply of lubricant is interrupted which means that no lubricant is consumed. During a restart procedure, at the beginning all of the lubricating points are lubricated such that the evaporation losses that have arisen owing to the slow cooling during the standstill period of the machine are compensated for. The time interval lengths are also successively increased.

In one form, a device of the present invention includes a lubrication system having a plurality of lubricant metering devices that are used to output lubricant at a plurality of lubricating points and are each allocated to one of several lubrication circuits. The lubricant metering devices are provided to simultaneously output an amount of lubricant, that is predetermined for each lubricant metering device, cyclically or regularly with a time interval between each outputting of the lubricant provided for the respective lubrication circuit. The device comprises a controlling unit which is used to monitor or control the lubrication system. Furthermore, in the case of the device, a plurality of temperature sensors are provided which are used to measure the temperature at a series of lubricating points or possibly even at all lubricating points and are connected to the controlling unit. The temperature is measured in direct proximity to the lubricating points and in this respect reference is also made to the statements in relation to the method in accordance with the invention. The lubricant metering devices are allocated to the lubrication circuits such that the temperatures of the lubricating points of a respective lubrication circuit are within a predetermined temperature range. It is thus ensured that the temperatures of the lubricating points of a lubrication circuit only deviate from each other by a known, predetermined amount. The controlling unit is designed such that the length of the time interval of a lubrication circuit is determined, whilst taking into account a set of evaporation characteristics of the lubricant, in dependence upon temperatures that have been measured in direct proximity to lubricating points of the lubrication circuit.

In this device in accordance with the invention that permits the implementation of the above described method in accordance with the invention, the advantages described in relation to the method are correspondingly produced.

This is also true for other preferred embodiments of the device disclosed herein.

The lubricant metering devices can be in particular injectors.

BRIEF DESCRIPTION OF THE DRAWINGS

The invention will be described in more detail hereinafter with the aid of exemplified embodiments and with reference to the Figures, in which.

DETAILED DESCRIPTION OF THE INVENTION

Figure 1:
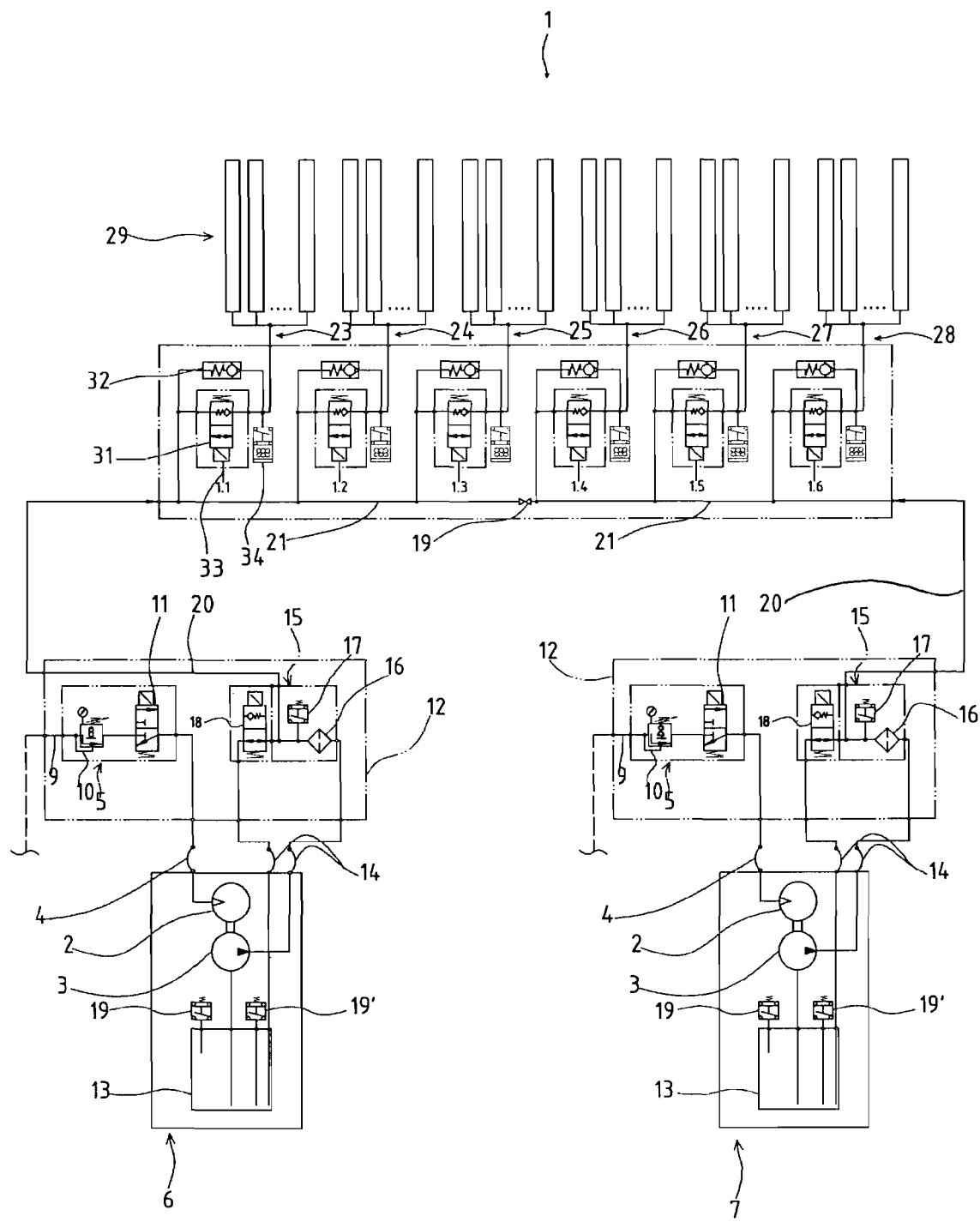
FIG. 1 shows a circuit diagram of a lubrication system for an I.S. glassware forming machine.

In the Figures, like features are referenced by like reference numbers. The lubrication system of FIG. 1 is referenced by reference number 1. The lubrication system 1 comprises two tank/pump units 6 and 7 which are technically designed in an identical manner which means that they can be described with identical reference numbers. The two tank/pump units 6, 7 are used to supply the lubrication system 1 with two different lubricants, for example with a high temperature lubricant and a normal lubricant.

Each tank/pump unit 6, 7 comprises a compressed air motor 2 that drives a pump 3. The compressed air motor 2 is connected via an air line 4 to a compressed air supply unit 5 that is a component of a monitoring unit 12. The compressed air supply unit 5 comprises a pressure adjuster 8 that is connected to a compressed air source (not shown) via an air line 9. The pressure in the air line 9 is transmitted to the pressure adjuster 8 by means of a control line 10.

Between the pressure adjuster 8 and the air line 4 there is located a 2 port-2 position valve 11 by means of which the compressed air motor 2 can be selectively supplied with compressed air. The pump 3 is used to pump [lubricant] from a lubricant reservoir 13 to a lubricant metering unit 15 via a lubricant line 14. The metering unit 15 comprises a filter 16, a pressure switch 17 and a 2 port-2 position valve 18. In the valve position shown in FIG. 1, the lubricant is carried back into the lubricant reservoir 13 via the lubricant line 14. The lubricant reservoir 13 comprises two pressure switches 19 and 19' to monitor a maximum and minimum fill level.

If the valve 18 is switched to the other position, the respective lubricant is pumped into a lubricant line 20, wherein the pressure switch 17 ensures a maximum pressure. The lubricant line 20 opens into a further lubricant line 21 in which a sealing plug 19 is disposed. Owing to the sealing plug 19 that correspondingly interrupts the accessible lubricant line 21, the tank/pump units 6, 7 are allocated to six lubrication circuits 23 to 28. The respective lubricant passes to the lubrication circuits 23 to 28 via the lubricant lines 20, 21.

Since the lubrication circuits 23 to 28 are basically designed to be identical, only the lubrication circuit 23 will be described here by way of example. It comprises a series of lubricant metering devices provided to output lubricant and of which only three are illustrated by way of example and are referenced in their entirety by the reference number 29. The lubricant metering devices 29 can be injectors for example. The lubrication circuit 23 is connected to the lubricant line 21 via a further 2 port-2 position valve 31. A non-return valve 32 is disposed in parallel with the valve 31. The valve 31 is switched via a control line 33 by the controlling unit shown in FIG. 2 into the blocking position shown in FIG. 1 or into the admission position.

Normally, the valve 18 is located in the blocking position instead of the illustrated admission position. In the blocking position, a corresponding pressure of the lubricant builds up in the lubricant line 21. If the valve 31 is switched for a short time into the admission position, the lubricant metering devices 29 output a predetermined amount of lubricant to an associated lubricating point (not shown) of the I.S. glassware forming machine. This amount of lubricant can be different for the individual lubricant metering devices 29 of the lubrication circuit 23 or of the other lubrication circuits 24 to 28. In order to achieve such different lubricant outputs, the stroke of a respective lubricant metering device can be adjusted accordingly in a known manner. The non-return valve 32 is used for rapid venting in order to be able to quickly switch the lubricant metering device 29 at zero pressure. A pressure switch 34 is disposed between the valve 31 and the lubricant metering devices 29 in order to monitor this process and also to detect any possible leaks.

Figure 2:
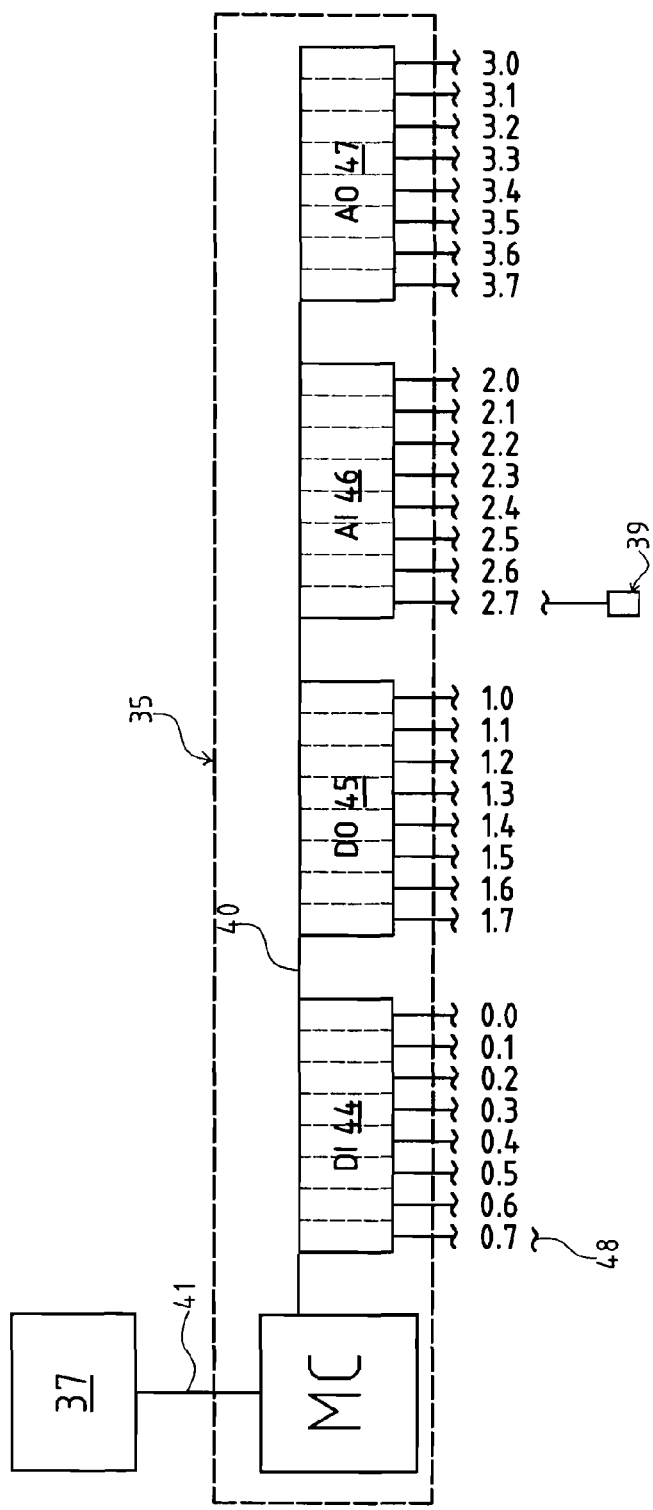
FIG. 2 shows a controlling unit for the lubrication system of FIG. 1.

The controlling unit of FIG. 2 is referenced by the reference number 35 and comprises a microcomputer MC. The microcomputer MC is provided with an input/output bus 40, to which a module DI with digital inputs 44, a module DO with digital outputs 45, a module AI with analogue inputs 46 and a module AO with analogue outputs 47 can be connected as required. By way of example, only eight inputs/outputs per module are illustrated.

Temperature sensors 39 are connected to the analogue inputs 46 and are disposed within the lubrication circuits 23 to 28 and are used to measure the temperature in direct proximity to different lubricating points. By way of example, only one temperature sensor 39 is illustrated. On the digital outputs 45, control signals are output via respective control lines 1.1 to 1.6 to the correspondingly designated control lines 33 to the valves 31 of the lubrication circuits 23 to 28. By means of the control signals, the valves 31 are switched in the admission direction in order to effect the output of lubricant by means of the respective lubricant metering device 29. The control line referenced by 1.7 is used for example to control further components of the lubrication system 1 such as, for example, the valve 11 for driving the pump 3.

The digital inputs 44 are used to detect signals which are relevant to the machine and influence the length of the time interval in accordance with which lubricant is output in each case. By way of example, a machine clock signal referenced by reference number 48 is symbolically illustrated.

The analogue outputs 47 are not used in the case of the illustrated controlling unit 35. They are provided for embodiments of the lubrication system which have been somewhat modified, wherein for example instead of the lubricant pump 3 an electrically operated lubricant pump is used. In the case of such an embodiment, the voltage needs to be controlled in order to keep the pressure in the lubricant line 20 at a value suitable for operation.

The length of the time intervals, in which control signals are regularly output in each case by one of the control lines 1.1 to 1.6 to the valves 31, is calculated based on machine signals. These machine signals include temperature values that have been measured by the temperature sensors 39, and the machine clock signal 48. For the purposes of the calculation, further specific features of the most vulnerable lubricating point in the respective lubrication circuit can be used, such as for example surface properties, the running speed, an axial lubricant outlet, etc., and specific features of the used lubricant (set of evaporation characteristics). The length of the time interval or the lubricating cycle time is adapted at regular time periods within the control process.

The controlling unit 35 of FIG. 2 is particularly suitable if a provided I.S. glassware forming machine is to be equipped or retrofitted with a device for supplying lubricant in accordance with the invention.

A bus system 41 that is provided by the microcomputer MC and is provided in this case as an Ethernet for simple connection to a PC is used for the purposes of display directly on a PC 37. Other display options are feasible as variations.

Figure 3:
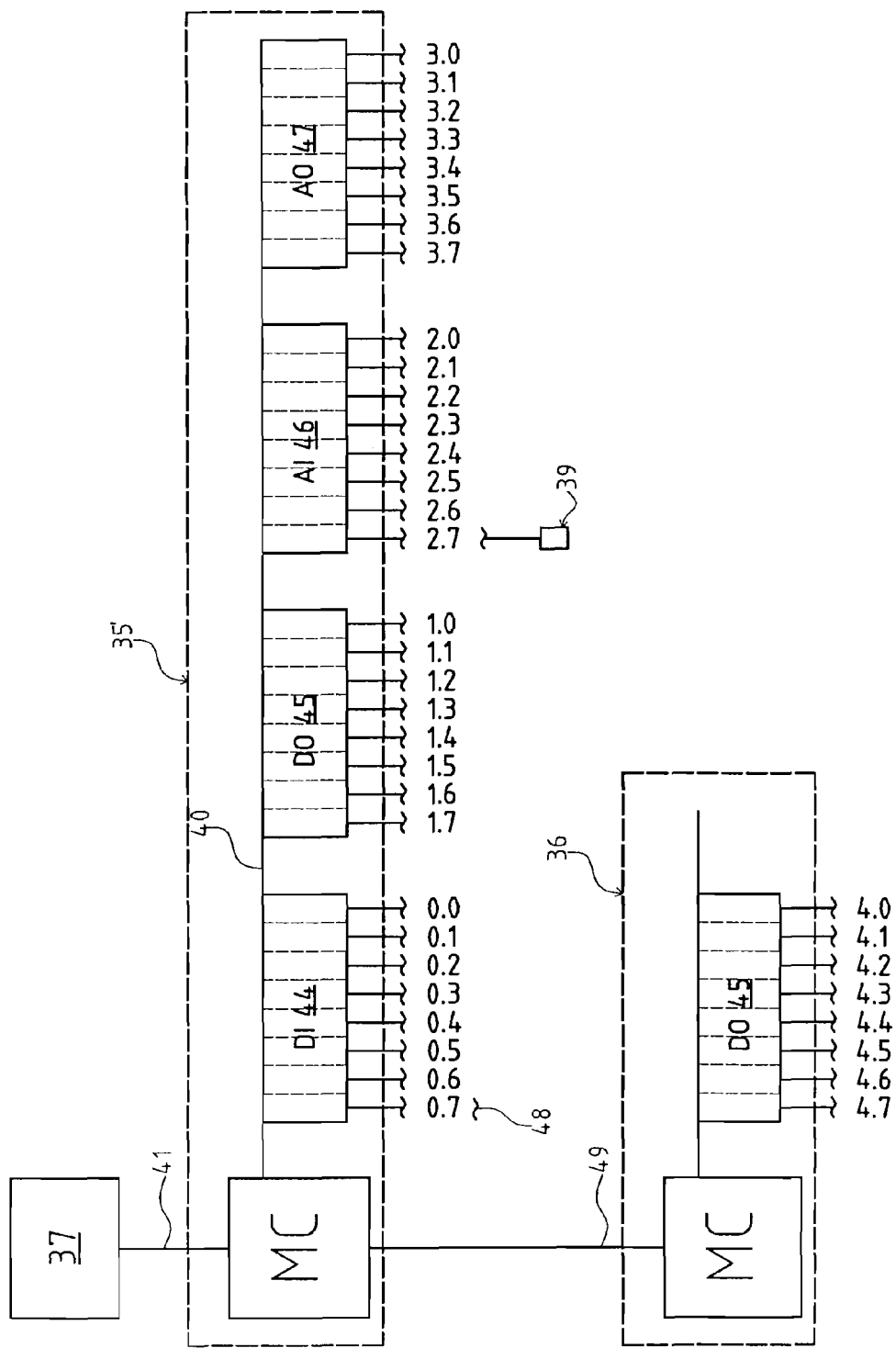
FIG. 3 shows a further embodiment of a controlling unit having a subordinate control unit for the lubrication system of FIG. 1.

Alternatively, as shown in FIG. 3, a combination of a controlling unit 35' and a control unit 36 can also be used. The controlling unit 35' has the task of detecting machine signals, such as the temperature values measured by the temperature sensors 39, and the machine clock 48, and of generating a controlled time interval as described above. The controlling unit 35' sends the information relating to the time interval via a field bus system 49 to the control unit 36 which likewise comprises a microcomputer MC. A required change or re-adjustment of the time interval is output by the controlling unit 35' to the control unit 36 in this manner.

The control unit 36 uses digital outputs 4.1 to 4.6 of a module DO to control the valves 31 and uses further module outputs, only partly illustrated by 4.0 and 4.7, to control all further components of the lubricant system 1, such as for example the valve 11 for driving the pump 3 in accordance with preset time intervals.

Figure 4:
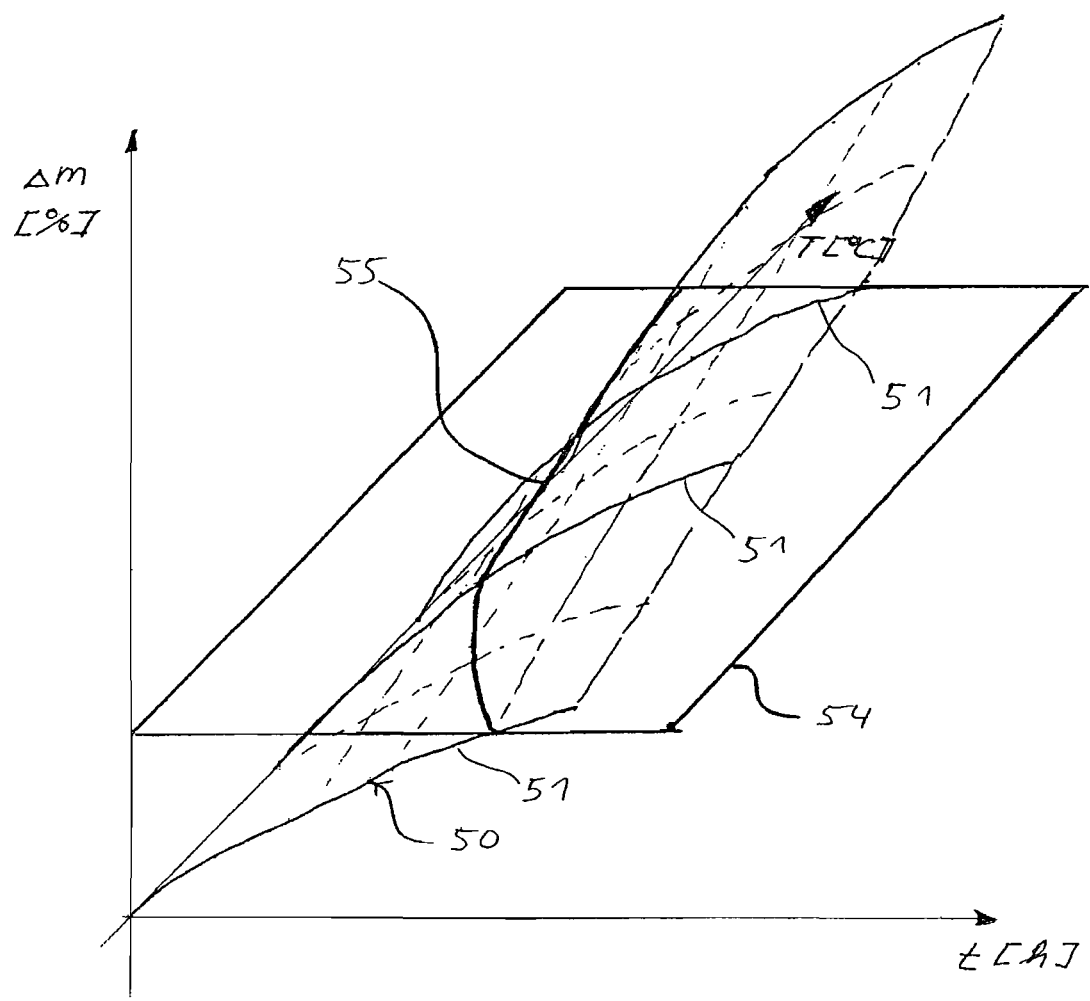
FIG. 4 shows a set of evaporation characteristics as used in the invention.

The set of characteristics of FIG. 4 is provided with the reference number 50 and could also be referred to as a "set of characteristic curves". The set of characteristics 50 illustrates for a particular lubricant, namely in this case a particular lubricating oil of a central lubrication system, the functional dependency of the three technical parameters: evaporation loss $\Delta m$ at a lubricating point, temperature T of the lubricating point and time t. To simplify matters, the temperature of only one lubricating point taken in isolation is considered, and in order to explain the principle the fact that a plurality of lubricating points are grouped to form a lubrication circuit as described above is not taken into account.

The evaporation loss $\Delta m$ that is illustrated as the loss of the mass m of the lubricating oil and is illustrated as a percentage with respect to the originally provided amount of lubricating oil increases with time. This means that the amount of the lubricating oil provided at the respective lubricating point is reduced over time. However, the evaporation loss taking place over time is substantially dependent upon the temperature provided at the lubricating point. Each temperature value thus has a characteristic curve 51 that illustrates the correlation between the evaporation loss and time. The set of characteristics 50 consists of a clutch of characteristic curves 51. The higher the temperature at the lubricating point, the greater the evaporation loss.

In accordance with the invention, there is provided the requirement that between two lubrication processes within a lubricating cycle, only one particular maximum evaporation loss may occur. This means that the more frequently lubrication has to be effected, the higher the temperature at the lubricating points of a lubrication circuit. This results in the fact that when the temperature of a lubricating point should rise, the time between two lubrication processes has to be shortened accordingly in order to ensure that the evaporation loss at the lubricating point does not exceed the provided maximum value.

A plane 54 is plotted in the diagram of FIG. 4 and is spanned by the time axis t and the temperature axis T and in which the evaporation loss has a constant value. This can be the maximum evaporation loss allowed between two lubrication processes or an evaporation loss value located slightly thereunder. In order to ensure that this evaporation loss value is not exceeded between two lubrication processes, the time in accordance with the time axis t between the lubrication processes must be shortened if the temperature T rises. In a corresponding manner, the time interval lengths between the lubrication processes of a lubricating cycle appertaining to a lubrication circuit can of course be lengthened if the temperature falls. A control characteristic curve 55 is thus produced. The control characteristic curve 55 is produced by the sectional graph of the plane 54 and of the set of characteristics 50. The control characteristic curve 55 shows, in dependence upon the temperature T, the length to be adjusted of the time interval between two successive lubrication processes of a lubricating cycle.

Such a set of characteristics can be determined in the laboratory for a lubricant or a lubricating oil in that the evaporation loss is measured under defined conditions for various temperature stages at time intervals. Since in the device of FIG. 1 two different lubricants are used, the control is effected using two associated sets of evaporation characteristics.

The invention claimed is:

1. A method for supplying lubricant to a plurality of lubricating points of an I.S. glassware forming machine, comprising:
providing a lubrication system having multiple lubrication circuits, and further having a plurality of lubricant metering devices which output the lubricant to the lubricating points, each of said lubricant metering devices being allocated to one of said multiple lubrication circuits, and wherein the lubricant metering devices of a respective lubrication circuit simultaneously output a predetermined amount of lubricant cyclically whereby successive outputs of said predetermined amounts of lubricant are provided with a time interval between the successive outputs being specific to each respective lubrication circuit;
allocating said lubricant metering devices to said lubrication circuits in dependence upon temperatures measured in direct proximity to at least a series of lubricating points, said allocation being carried out such that the temperatures of the lubricating points of a respective lubrication circuit are within a predetermined temperature range; and
controlling the amount of lubricant provided at the lubricating points, said controlling step including determining the length of the time interval allocated to a respective lubrication circuit, whilst taking into account a set of evaporation characteristics of the lubricant, in dependence upon temperatures that have been measured in direct proximity to lubricating points of the respective lubrication circuit, by using a set of the evaporation characteristics of the lubricant.

2. The method as claimed in claim 1, wherein the highest of the measured temperatures of the lubricating points is used as the decisive factor for determining the time interval lengths.

3. The method as claimed in claim 2, wherein the time interval lengths are additionally determined in dependence upon one or more parameters from the group consisting of: kinematic conditions, tribological conditions, geometric conditions, cooling conditions and process variables.

4. The method as claimed in claim 3, wherein speed values of the lubricating points are also included in the set of evaporation characteristics.

5. The method as claimed in claim 2, wherein the lubricant metering devices of a lubrication circuit are designed to output an amount of lubricant adapted to the respective lubricating point.

6. The method as claimed in claim 1, wherein the time interval lengths are additionally determined in dependence upon one or more parameters from the group consisting of: kinematic conditions, tribological conditions, geometric conditions, cooling conditions and process variables.

7. The method as claimed in claim 6, wherein speed values of the lubricating points are also included in the set of evaporation characteristics.

8. The method as claimed in claim 6, wherein the lubricant metering devices of a lubrication circuit are designed to output an amount of lubricant adapted to the respective lubricating point.

9. The method as claimed in claim 1, wherein the lubricant metering devices of a lubrication circuit are designed to output an amount of lubricant adapted to the respective lubricating point.

10. The method as claimed in claim 1, wherein when starting up the I.S. glassware forming machine an automatic start-up procedure takes place in which the time interval lengths are successively increased.

11. A method as claimed in claim 1, including the use of a plurality of lubricants which include at least one that has a set of evaporation characteristics that are different from another of the lubricant(s) (said at least one referred to herein as "the additional lubricant") and applying said additional lubricant to lubricating points of a respective lubricating circuit by means of a lubricant metering device that is allocated to that circuit.

12. The method as claimed in claim 1, wherein the lubricating points to which lubricant is supplied include one or more of the following mechanisms of the glassware forming machine: the plunger mechanism, the feeder mechanism, and the shearing mechanism.

13. The method as claimed in claim 1 further comprising:
decreasing the time interval between successive outputs of lubricant to the lubricating points of any one respective lubrication circuit when the temperatures measured in direct proximity to the lubricating points of said one respective lubrication circuit increases, thereby increasing the amount of lubricant provided to the lubricating points of said one respective lubrication circuit.

14. The method as claimed in claim 1 further comprising:
increasing the time interval between successive outputs of lubricant to the lubricating points of any one respective lubrication circuit when the temperatures measured in direct proximity to the lubricating points of said one respective lubrication circuit decreases, thereby decreasing the amount of lubricant provided to the lubricating points of said one respective lubrication circuit.

15. A method for supplying lubricant to a plurality of lubricating points of an I.S. glassware forming machine, comprising:
providing a lubrication system having multiple lubrication circuits, and further having a plurality of lubricant metering devices which output the lubricant to the lubricating points, each of said lubricant metering devices being allocated to one of said multiple lubrication circuits;
wherein the lubricant metering devices of a respective lubrication circuit simultaneously output a predetermined amount of lubricant cyclically in which successive outputs of said predetermined amount of lubricant are provided, there being a time interval between said successive outputs specific to each respective lubrication circuit, which time interval can be increased to decrease a frequency of the cycle and thereby provide less lubricant, and decreased to increase the frequency of the cycle and thereby provide more lubricant;
allocating said lubricant metering devices to said lubrication circuits in dependence upon temperatures measured in direct proximity to at least a series of lubricating points, said allocation being carried out such that the temperatures of the lubricating points of a respective lubrication circuit are within a predetermined temperature range; and controlling the amount of lubricant provided at the lubricating points, said controlling step including determining the length of the time interval allocated to a respective lubrication circuit, in dependence upon temperatures that have been measured in direct proximity to lubricating points of the respective lubrication circuit, by using a set of the evaporation characteristics of the lubricant.

\* \* \* \* \*